US007672946B2

(12) United States Patent
Kudo et al.

(10) Patent No.: US 7,672,946 B2
(45) Date of Patent: Mar. 2, 2010

(54) INFORMATION PROCESSOR, DATABASE SEARCH SYSTEM AND ACCESS RIGHTS ANALYSIS METHOD THEREOF

(75) Inventors: Michiharu Kudo, Kamakura (JP); Makato Murata, Kawasaki (JP); Akihiko Tozawa, Minato-Ku (JP); Satoshi Hada, Setagaya-Ku (JP)

(73) Assignee: International Business Machines Corporation, Armonk, NY (US)

( * ) Notice: Subject to any disclaimer, the term of this patent is extended or adjusted under 35 U.S.C. 154(b) by 1582 days.

(21) Appl. No.: 10/735,837

(22) Filed: Dec. 15, 2003

(65) Prior Publication Data

US 2004/0193607 A1 Sep. 30, 2004

(30) Foreign Application Priority Data

Mar. 25, 2003 (JP) ............................. 2002-083243

(51) Int. Cl.
*G06F 17/30* (2006.01)
(52) U.S. Cl. ................... 707/9; 726/26; 726/27
(58) Field of Classification Search ............. 707/3, 707/10, 9; 726/26, 27
See application file for complete search history.

(56) References Cited

U.S. PATENT DOCUMENTS

| 6,970,891 | B1 * | 11/2005 | Deo et al. ................ 707/205 |
| 2003/0191846 | A1 * | 10/2003 | Hunnicutt et al. ........... 709/229 |
| 2003/0229852 | A1 * | 12/2003 | Uramoto et al. ............. 715/513 |
| 2004/0073870 | A1 * | 4/2004 | Fuh et al. .................. 715/513 |
| 2004/0172234 | A1 * | 9/2004 | Dapp et al. .................. 704/1 |

OTHER PUBLICATIONS

Article entitled "A Fine-Grained Access Control System for XML Documents" by Damiani et al. on May 2002.*
Article entitled "Extended Path Expressions for XML" by Murata on Apr. 29 2001.*
Article entitled "Regulating Access to XML documents" by Gabillon et al. on Jul. 2001.*
Article entitled "Efficient Filtering of XML Documents for Selective Dissemination of Information" by Altinel et al. in 2000.*
Michiharu Kudo and Satoshi Hada, XML Security Based On Provisional Authorization, ACM 1-58113-203-4/00-0011.
W3C: XQuery 1.0: A XML Query Language, http://www.w3.org/TR/2002/-xquery-20020430.
Makoto Murata, "XML[I]-XML Schema and Relax-", The Institute of Electronics, Information and Communication Engineers, Dec. 2001, vol. 84, No. 12, p. 890-894.
Kudo et al., "XML Document Security based on Provisional Authorization", Proceedings of the 7th ACM Conference on Computer and Communications Security, Nov. 2000, p. 87-96.

* cited by examiner

*Primary Examiner*—Tim T. Vo
*Assistant Examiner*—Mahesh H Dwivedi
(74) *Attorney, Agent, or Firm*—Donald L. Wenskay

(57) ABSTRACT

An access rights analysis including a query automaton generation unit for generating a query automaton from a path expression in which retrieval conditions for a database. An access control automaton generation unit generates an access control automaton from an access control policy; a schema automaton generation unit generates a schema automaton from a schema; and a logic operation unit performs a logic operation related to each of the generated automatons. By use of the above components, access rights in database retrieval using the path expressions are decided without checking the XML document itself in the XML database and checking by each node.

9 Claims, 15 Drawing Sheets

```
<bib>
    <book>
        <title>TCP/IP illustrated</title>
        <author>W. Stevens</author>
        <price>50.00</price>
    </book>
    <book>
        <title>Data on the Web</title>
        <author>S. Abiteboul</author>
        <author>P. Buneman</author>
        <author>D. Suciu</author>
        <price>40.00</price>
    </book>
</bib>
```
FIG 3
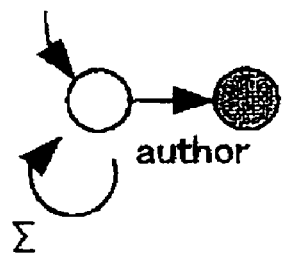
FIG 4
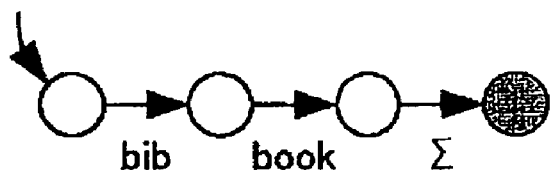
FIG 5

331

| /bib |
| --- |
| /bib/book |
| /bib/book/title |
| /bib/book/author |
| /bib/book/price |

| /bib/book | +r |
| --- | --- |
| /bib/book/title | +r |
| /bib/book/author | +r |
| /bib/book/price | ¬r |

FIG 10

```
1. <bib> {
2.   for $b in document("http://www.bn.com")/bib/book
3.   where $b/publisher = "Addison-Wesley" and $b/@year > 1991
4.   return
5.     <book year={ $b/@year }>
6.       { $b/title }
7.     </book>
8. }
9. </bib>
```

FIG 12

| EXPRESSION ON QUERY EXPRESSION | RETRIEVED PATH EXPRESSION (XPath) | GROUP |
|---|---|---|
| 2ND LINE, document .. /book | document("http://www.bn.com")/bib/book | A |
| 3RD LINE, $b/publisher | document("http://www.bn.com")/bib/book/publisher | B |
| 3RD LINE, $b/@year | document("http://www.bn.com")/bib/book/@year | B |
| 5TH LINE, $b/@year | document("http://www.bn.com")/bib/book/@year | B |
| 6TH LINE, $b/title | document("http://www.bn.com")/bib/book/title | B |

FIG 13

| EXPRESSION ON QUERY EXPRESSION | RETRIEVED PATH EXPRESSION (XPath) | ANALYSIS RESULT |
|---|---|---|
| 2ND LINE, document../book | document("http://www.bn.com")/bib/book | ALWAYS PERMITTED |
| 3RD LINE, $b/publisher | document("http://www.bn.com")/bib/book/publisher | ALWAYS PERMITTED |
| 3RD LINE, $b/@year | document("http://www.bn.com")/bib/book/@year | ALWAYS DENIED |
| 5TH LINE, $b/@year | document("http://www.bn.com")/bib/book/@year | ALWAYS DENIED |
| 6TH LINE, $b/title | document("http://www.bn.com")/bib/book/title | ALWAYS PERMITTED |

FIG 14

```
1. <bib> [
2.   for $b in document("http://www.bn.com")/bib/book
3.   where $b/publisher = "Addison-Wesley" and $empty > 1991
4.   return
5.     <book year={ $empty }>
6.       { $b/title }
7.     </book>
8. ]
9. </bib>
```

FIG 15

INFORMATION PROCESSOR, DATABASE SEARCH SYSTEM AND ACCESS RIGHTS ANALYSIS METHOD THEREOF

FIELD OF THE INVENTION

The present invention relates to access control, more particularly to access control for a database handling a document file described in XML (Extensible Markup Language).

BACKGROUND

A document described in XML (XML document) can be expressed by a tree structure including elements and attributes. Conditions for this tree structure can be described by use of a schema. Therefore, by use of this schema, it is possible to create such a system as to permit only an XML document having a tree structure satisfying specific conditions (as to the schema, for example, refer to Makoto Murata, "XML[I]-XML Schema and Relax-", The Institute of Electronics, Information and Communication Engineers, December, 2001, Vol. 84, No. 12, p. 890-894).

In a database handling the XML document (XML database), not only a document is retrieved but also elements and attributes in the XML document can be selectively retrieved while placing limitations thereon. For example, processing such as retrieval of all elements representing paragraphs (elements represented by <p> . . . </p>) is possible. As a method for describing retrieval conditions, the W3C (World Wide Web Consortium) recommendation as XPath is widely used.

Moreover, in the XML database, not only the elements and attributes are retrieved but also a new XML document can be created by use of the retrieved elements and attributes. As a query language including such a function, a specification as XQuery has been designed by the W3C. XQuery uses XPath as a mechanism for retrieving the elements and attributes.

Furthermore, as to a case where it is required, in the XML database, to access the elements and attributes which constitute the XML document, as a concrete example, an XML document expressing a list of employees of a certain company is considered. For each of the employees, his/her annual salary and employee number are indicated. The employee, salary and employee number are assumed to be represented by an employee element, a salary element and a number element, respectively. In an XML database storing such an XML document, no particular limitation is required for an access to the number element. However, in some cases, an access to the salary element must be limited to some people. A description of who can access which elements or attributes is called an access control policy. A user describes the access control policy and gives the policy to the XML database. With respect to an access request for the XML document, the XML database utilizes the given access control policy and decides whether an access to elements or attributes is permitted or denied.

There is XACL (XML Access Control Language) as a language for expressing the access control policy (as to XACL, for example, refer to Michiharu Kudo and Satoshi Hada, "XML Document Security based on Provisional Authorization", Proceedings of the 7th ACM Conference on Computer and Communications Security, November, 2000, p. 87-96). In language specifications of XACL, described is an algorithm for deciding whether an access is permitted or denied for a given access request. This algorithm performs the decision for one predetermined node. Therefore, when XPath or a retrieval by XPath accesses plural nodes, this algorithm is executed once for any of the nodes.

As described above, in the XML database, it is required to decide whether the access to elements or attributes is permitted or denied for the access request, by use of the given access control policy. In order to improve this performance of the XML database, it is required to perform an access right decision at high speed.

However, an access right decision algorithm described in the language specifications of XACL that is the language for expressing the access control policy is not rapid. Moreover, as described above, in an actual access right decision, processing by this algorithm is repeated for many nodes. Thus, execution performance of the algorithm is not practical.

Note that, in the foregoing conventional technology, XPath and XQuery are enumerated as methods for describing the retrieval conditions of the XML database. However, there are other methods than the above-described, including one similar to XPath (called a path expression) and one similar to XQuery (called a query expression). However, all XML databases by the methods described above are similar to each other in the point that processing is executed taking such a procedure as below.

When
   path expression (or query expression including path expression)
   XML document are given,
   node in XML document (element/attribute/text)

is retrieved. Thereafter, it is decided whether access to the retrieved node is permitted by referring to
   access control policy Therefore, by any of the methods, if there are, for example, 1000 elements or attributes retrieved, this decision is repeated by 1000 times. Thus, it is a common problem that this processing takes an enormous amount of time.

Consequently, the present invention has an object to realize an access rights analysis in a database handling a data file, in which a structured document such as an XML document is described, without checking the data file itself and/or its node and to improve retrieval performance of the database.

SUMMARY OF THE INVENTION

The present invention achieving the foregoing object is realized as an information processor which analyzes the right of access to a database handling a data file in which a structured document such as an XML document is described, the information processor having such a constitution as below. This information processor includes: a query automaton generation unit for generating a query automaton from a path expression in which a retrieval condition for the database is described; an access control automaton generation unit for generating an access control automaton from an access control policy in which an access control rule is described; a schema automaton generation unit for generating a schema automaton from a schema showing a structure of the data file stored in the database; and a logic operation unit for deciding access rights for database retrieval using the path expression by performing logic operations related to the generated query automaton, access control automaton and schema automaton.

Moreover, the information processor of the present invention further includes a path table control unit for controlling a path table in which a path of the data file stored in the database is described. The logic operation unit can decide the access rights directly from this path table or by generating the schema automaton.

Furthermore, it is possible to extract a path expression to be subjected to the access rights analysis from a query expression which specifies a retrieval method for the database. In this case, based on a result of access right decision performed by the logic operation unit with respect to individual path expressions extracted from the query expression, the access rights in database retrieval using the query expression are decided.

Another invention achieving the foregoing object is also realized as such an access rights analysis method as below, which analyzes the right of access to a database storing XML documents by use of a computer. This access rights analysis method includes the steps of: generating a query automaton from a path expression in which a retrieval condition for the database is described, generating an access control automaton from an access control policy in which an access control rule is described and storing the generated query automaton and access control automaton in predetermined storage means; and, deciding the access right in database retrieval using the path expression without checking the XML documents stored in the database, by performing logic operations related to the query automaton and access control automaton.

Moreover, another access rights analysis method of the present invention includes the steps of: selecting a predetermined path, by use of a path expression in which a retrieval condition for a database is described, from a path table in which a path of a data file stored in the database is described, the path table being stored in predetermined storage means; and, deciding an access right in database retrieval using the path expression with respect to the predetermined path, by applying an access control policy in which an access control rule is described.

Furthermore, the present invention is also realized as a program which realizes respective functions of any of the above-described access rights analysis device and database retrieval system by controlling a computer or as a program which allows the computer to execute processing equivalent to the respective steps of the foregoing access rights analysis method. This program is provided by being distributed as stored in a magnetic disk, an optical disk, a semiconductor memory and/or other recording mediums or by being delivered via a network.

BRIEF DESCRIPTION OF THE DRAWINGS

FIG. 3 is a view showing an example of an XML document to be retrieved according to the embodiment 1.

FIG. 4 is a view showing a query automaton in the case where an XPath expression desired to be retrieved with respect to the XML document of FIG. 3 is all author elements.

FIG. 5 is a view showing a query automaton in the case where an XPath expression desired to be retrieved with respect to the XML document of FIG. 3 is all children of a book element under the bib element.

FIG. 9 is a view showing an example of a path table prepared for the XML document shown in FIG. 3.

FIG. 10 is a view showing a state where decision information of access control is registered in the path table of FIG. 9.

FIG. 12 is a view showing an example of a query expression (XQuery).

FIG. 13 is a chart showing a list of path expressions extracted from the query expression of FIG. 12.

FIG. 14 is a chart showing results (decision results) of access rights analyses for the individual path expressions extracted from the query expression of FIG. 12.

FIG. 15 is a view showing a state where rewriting is performed for the query expression of FIG. 12.

DETAILED DESCRIPTION

Figure 1:
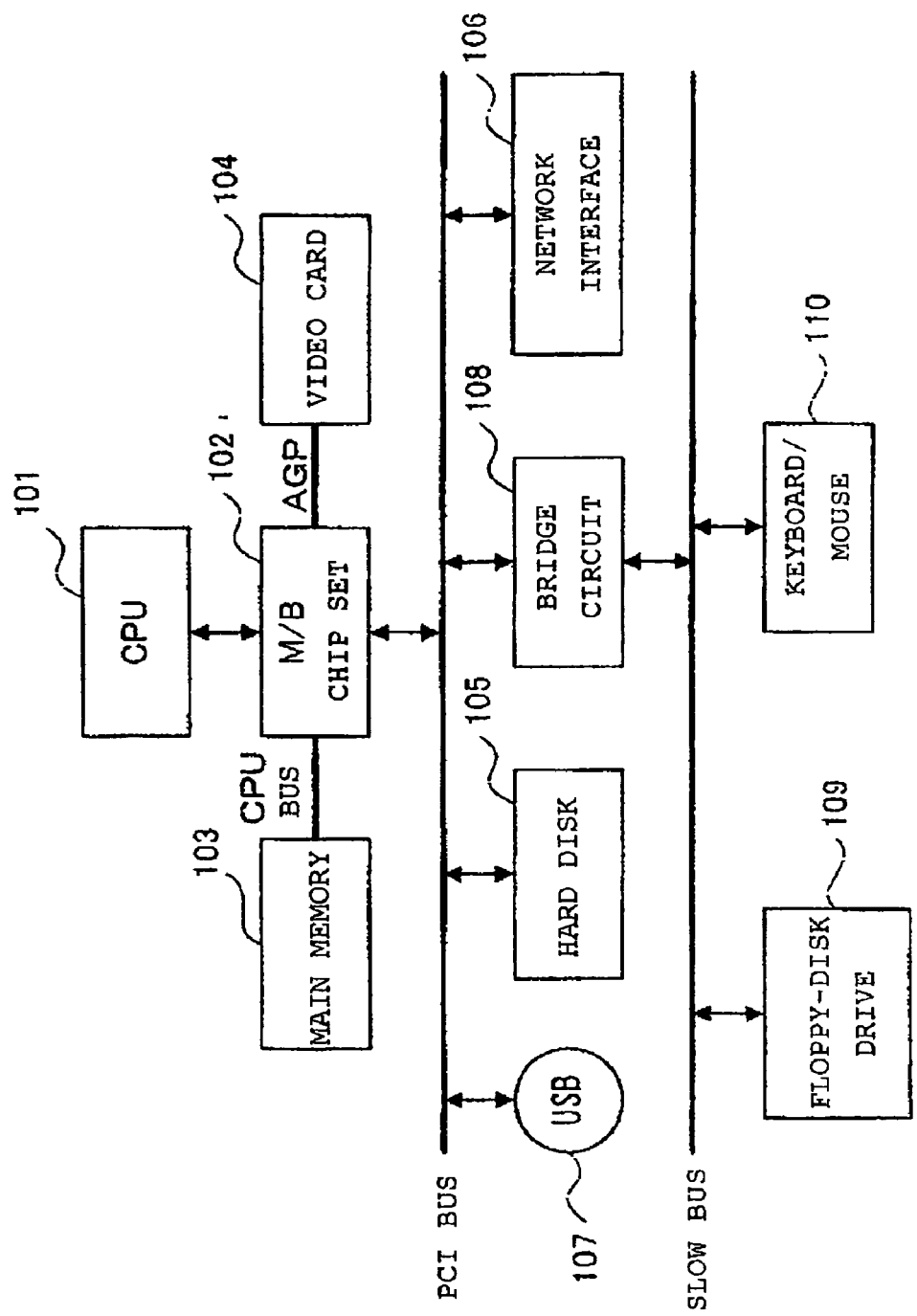
FIG. 1 is a view schematically showing an example of a hardware configuration of a computer device suitable for realizing an access rights analysis device according to an embodiment.

Hereinafter, the present invention will be described in detail based on embodiments shown in the accompanying drawings.

In an access rights analysis for an XML database, prior to an actual analysis performed by checking a structure of an XML document, the present invention executes a preliminary access rights analysis by using a schema or a path table. In this premilinary analysis, it is decided before retrieval of the XML document whether an access to the XML database by a predetermined path expression in which a retrieval condition is described is always permitted, always denied or the propriety of access is indeterminate. Accordingly, only in the case where the propriety of access is decided to be indeterminate, the regular access rights analysis performed by checking the structure of the XML document is performed.

Depending on combination of the path expression in which the retrieval condition is described and an access control policy indicating an access condition, there are cases where the access rights analysis is possible at the stage before the retrieval of the XML document. Some examples of the case capable of executing the analysis are enumerated.

Example 1

It is assumed that an access control policy permits a user guest to access an element p. An XPath expression (path expression) is assumed to be //p. This XPath retrieves all elements having a tag name p. It is previously guaranteed that the user guest can access the retrieved elements. In any document, //p never retrieves elements for which the user has no access right. In this case, it is unnecessary to perform an access right decision for each of the elements p.

Example 2

Contrary to the EXAMPLE 1, it is assumed that the access to the element p by a user guest is prohibited. In this event, it is obvious that the user guest has no access right for the elements retrieved by the XPath expression //p. In this case, even the retrieval of the elements by //p is unnecessary. It is satisfactory that processing is simply carried out assuming that the user has no access right.

Example 3

It is assumed that an access control policy permits an access to p element that is a descendant of a sec element. An XPath expression is assumed to be //sec//p. This XPath retrieves all elements which have the tag name p and are descendants of elements having a tag name sec. In this case, it is obvious that the user guest can access the retrieved elements.

Example 4

An access control policy is assumed to be the same as that in EXAMPLE 3. Additionally, it is assumed that a schema exists and this schema permits the elements having the tag name p only as child elements of the elements having the tag name sec. In this case, it is obvious that the user guest can access the elements retrieved by the XPath expression //p.

Example 5

It is assumed that an access control policy prohibits an access to a sec element and its descendants. An XPath expression is assumed to be //sec//p. It is obvious that the user has no access right for elements retrieved by this XPath.

Example 6

An access control policy is assumed to be the same as that in EXAMPLE 5. Additionally, it is assumed that a schema exists and this schema permits the elements having the tag name p only as child elements of the elements having the tag name sec. Also in this case, it is obvious that the user has no access right for the elements retrieved by the XPath expression //p.

These examples are just an example of the case where the access rights analysis is possible without checking the XML document or its nodes. When an access decision is possible by such a preliminary access rights analysis, this decision may be performed only once before the retrieval of the XML document and there is no need to repeat the access decision for each of the nodes of the retrieved XML document. Thus, significant performance improvement can be expected.

Hereinafter, the present invention will be described by sorting the embodiments into: an access rights analysis using a path expression (XPath) (Embodiments 1 and 2); an access rights analysis using a query expression (XQuery) including a path expression (Embodiment 3); and implementation examples of the above (Embodiments 4 and 5).

Embodiment 1

In an access rights analysis according to this embodiment, an access control automaton $\Gamma$ is generated from an access control policy and a schema automaton S is generated from a schema. Thereafter, by use of the access control automaton $\Gamma$ and the schema automaton S, the propriety of access to a predetermined path expression q is decided.

An automaton is widely known as a mechanism for checking a sequence including several symbols and deciding whether or not the sequence is accepted. The definition of the automaton and the logic operation for the automaton are described in detail, for example, in J. Hopcroft/J. Ullman, "Information & computing (3) and (4)", Science, 1986. Moreover, as a method for describing a set of symbol sequences, there is a regular expression. The regular expression can be converted into the automaton and a method of the conversion is also described in J. Hopcroft/J. Ullman, "Information & computing (3) and (4)", Science, 1986.

Here, a path means any of the following.

one in which tag names up to a certain element (not necessarily a leaf of a tree structure) from a root element of an XML document are lined up Example: /ab/c (herein, a, b and c are tag names)

one in which tag names up to a certain element (not necessarily a leaf of a tree structure) from a root element of an XML document are lined up and an attribute name of a certain attribute of this element is added thereto Example: /a/b/c/@d (herein, d is an attribute name)

one in which tag names up to a certain element (not necessarily a leaf of a tree structure) from a root element of an XML document are lined up and information of referring to a text of this element is added thereto.

Example: /a/b/c/text( )

A path expression is an expression for expressing conditions for the path. For example, "starting from root element foo to reach element p" is a path expression. XPath that is one of the path expressions expresses this condition expression as /foo//p. In this embodiment, this XPath is used as the path expression.

The access control policy includes several access control rules. Each of the rules describes the propriety of access by use of the path expression. When a path of a certain node coincides with this path expression, the access is permitted or denied. As described above, in this embodiment, the access control automaton is introduced for deciding access rights for nodes in the XML document. The access control automaton is such an automaton as to decide the access right to be present if the path up to a certain node from the root element of the XML document is accepted or on that particular occasion.

Furthermore, in this embodiment, a query automaton is introduced for retrieving nodes in the XML document by use of XPath. The query automaton is such an automaton as to retrieve the nodes if the path up to a certain node from the root element of the XML document is accepted, or on that particular occasion. The query automaton is generated from the XPath expression.

Moreover, in this embodiment, the schema is assumed to be one including several rules lined up therein, each of the rules having a shape as below.

nonterminal symbol x::=regular expression r

Symbols constituting the regular expression r are a pair of a tag name and the nonterminal symbol x or a pair of an attribute name and the nonterminal symbol x. Some of the nonterminal symbols x are specified as start symbols. As a language for expressing the schema, DTD (Document Type Definition), W3C XML Schema, RELAX (REgular LAnguage description for XML) NG and the like are known. It is easy to convert schemas written in these schema languages into schemas having the foregoing shape. Therefore, this embodiment is also applied to the schemas written in these schema languages.

As described above, in this embodiment, the schema automaton is introduced for checking the schema against the access control automaton and the query automaton. The schema automaton is an automaton which accepts all paths up to an arbitrary node from a root node of an adequate document by referring to the schema and accepts no path other than the above.

FIG. 1 is a view schematically showing an example of a hardware configuration of a computer device suitable for realizing an access rights analysis device according to this embodiment.

The computer device shown in FIG. 1 includes: a CPU (Central Processing Unit) 101 as an operation means; a main memory 103 connected to the CPU 101 via an M/B (motherboard) chip set 102 and a CPU bus; a video card 104 similarly connected to the CPU 101 via the M/B chip set 102 and an AGP (Accelerated Graphics Port); a hard disk 105, a network interface 106 and a USB port 107 which are connected to the M/B chip set 102 via a PCI (Peripheral Component Interconnect) bus; and a floppy-disk drive 109 and a keyboard/mouse 110 which are connected to the M/B chip set 102 via the PCI bus, a bridge circuit 108 and a slow bus such as an ISA (Industry Standard Architecture) bus.

Note that FIG. 1 merely shows an example of the hardware configuration of the computer device which realizes this embodiment. Thus, other various configurations can be adopted if this embodiment is applicable thereto. For example, a configuration may be adopted, in which only a video memory is mounted instead of providing the video card 104 and image data are processed by the CPU 101. Alternatively, via an interface such as an ATA (AT Attachment), a CD-ROM (Compact Disc Read Only Memory) drive or a DVD-ROM (Digital Versatile Disc Read Only Memory) drive may be provided.

Figure 2:
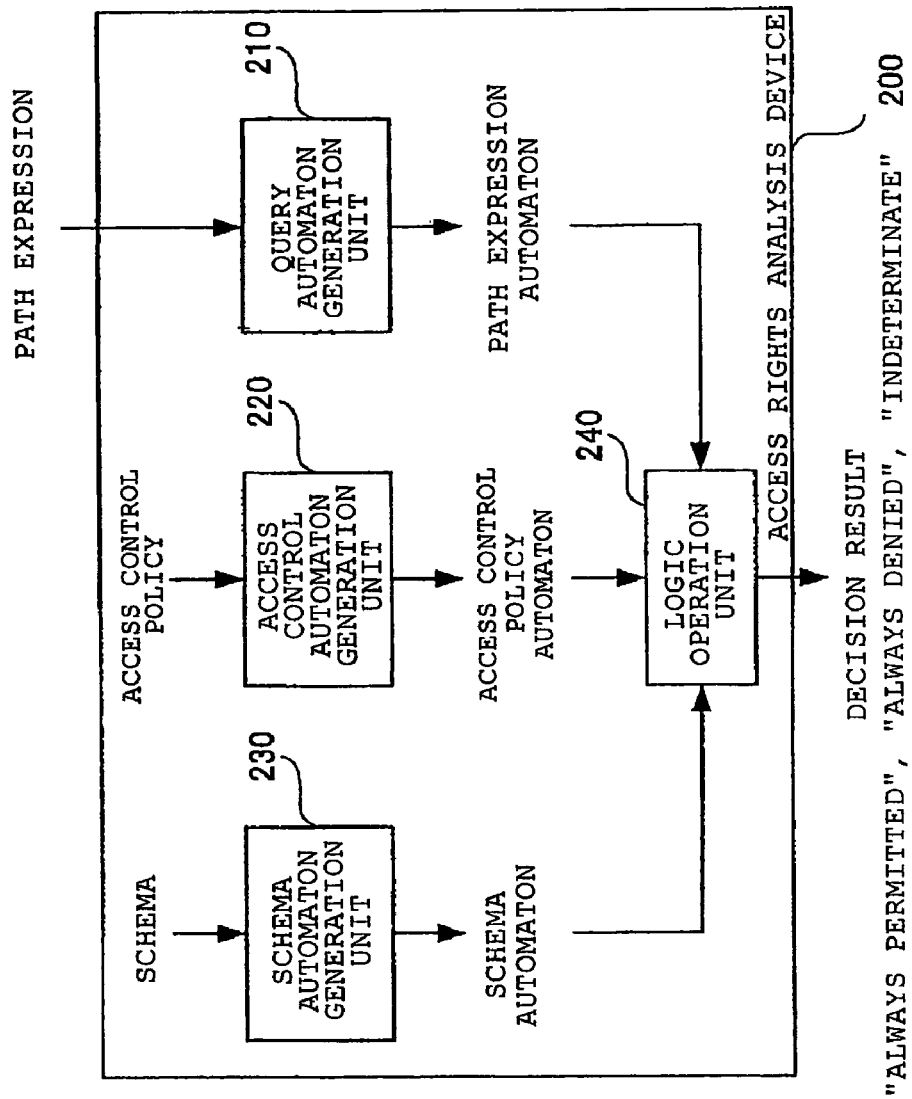
FIG. 2 is a block diagram showing a functional configuration of an access rights analysis device according to embodiment 1.

FIG. 2 is a block diagram showing a functional configuration of the access rights analysis device according to this embodiment.

As shown in FIG. 2, the access rights analysis device 200 according to this embodiment includes: a query automaton generation unit 210 for establishing a query automaton from a path expression; an access control automaton generation unit 220 for generating an access control automaton from an access control policy; a schema automaton generation unit 230 for generating a schema automaton from a schema; and a logic operation unit 240 for performing an access right decision by use of these automatons. The access rights analysis device executes a preliminary access rights analysis before retrieving an XML document in a former part of an XML database.

Each of the above-described constituent components is, for example, a virtual software block realized when the CPU 101 is controlled by a program developed in the main memory 103 shown in FIG. 1. The program which realizes these functions by controlling the CPU 101 is provided by being distributed as stored in a magnetic disk, an optical disk, a semiconductor memory or other recording mediums or by being delivered via a network. In this embodiment, the program is inputted via the network interface 106, the floppy-disk drive 109, which are shown in FIG. 1, a nonillustrated CD-ROM drive or the like and is stored in the hard disk 105. Thereafter, the program stored in the hard disk 105 is read into the main memory 103, developed therein and executed in the CPU 101. Thus, these functions are realized.

In the foregoing configuration, the query automaton generation unit 210 generates the query automaton by inputting a path expression specifying a retrieval condition. Specifically, upon receiving an XPath expression to be analyzed, the query automaton generation unit regards the XPath expression as a regular path expression and expresses one further converted into a query automaton by the query automaton q. The generated query automaton is retained, for example, in a working space of the main memory 103 shown in FIG. 1 and is used by the logic operation unit 240.

Here, in this embodiment, used is a technique of regarding the XPath as a regular path expression (=restriction expression indicating a path up to a predetermined node by a regular expression). To be more specific, "/" is regarded as the regular expression e. Here, e represents a null character.

"//title" is regarded as the regular expression S*.title. Here, S* represents repetition of an arbitrary element name by the optional number of times. Moreover, "." indicates connection and thus S*.title means a path of an XML document, such as one in which title comes after the repetition of the arbitrary element name.

"/bib/book/title" is regarded as the regular expression bib.book.title. This means such a path as to pass bib, book and title in this order.

When the path up to the predetermined node (element, attribute or text) n belongs to the path regular expression r, this means that the node n is selected by the path regular expression r.

FIG. 3 is a view showing an example of an XML document to be retrieved.

Considering the retrieval for the XML document of FIG. 3, if an XPath expression wished to be retrieved is all author elements, that is, //author, the query automaton q becomes an automaton shown in FIG. 4. Moreover, if the XPath expression is all children of a book element under a bib element, that is, /bib/book/*, the query automaton q becomes an automaton shown in FIG. 5.

The access control automaton generation unit 220 generates the access control automaton from the access control policy given for access control. The generated access control automaton is retained, for example, in the working space of the main memory 103 shown in FIG. 1 and used by the logic operation unit 240.

In the case of describing the access control policy by XACL2 (one obtained by defining transmission of access control of XACL as below), its access control rules are expressed by combinations of subject (main body of retrieval), XPath and action (contents of access and information on the propriety thereof).

The respective access control rules of XACL2 are assumed to be described as below.

(Admin, /, +r)
(Guest, /bib/book, +r)
(Guest, //price, −r)

Meanwhile, for interpretation of a read policy in XACL2, there are principles as below.

grant read +r is transmitted downward.
deny read −r is transmitted downward.
r is prioritized over +r and default is −r.

Specifically, when Guest views the XML document of FIG. 3, +r of /bib/book is transmitted downward and −r of //price is prioritized. Thus, what Guest sees is all the nodes without the price element.

In this embodiment, a subject is assumed to be previously given. A general case where the subject is variable will be examined in the embodiments 4 and 5.

Upon receiving the policy descriptions (+r and −r) and subjects (Admin and Guest) as described above, the access control automaton generation unit 220 calculates the following automatons $R^+$ and $R^-$.

The automaton $R^+$ is the sum of all automatons corresponding to a path regular expression equivalent to XPath in which the action +r for its subject is permitted.

The automaton $R^-$ is the sum of all automatons corresponding to a path regular expression equivalent to XPath in which the action −r for its subject is permitted.

Conversion of the regular expression into the automaton and the algorithm of the set operation for the automaton are widely known (for example, refer to J. Hopcroft/J. Ullman, "Information & computing (3) and (4)", Science, 1986). Furthermore, the access control automaton generation unit 220 calculates the access control automaton $\Gamma$ as below.

$$\Gamma = R^+ \cdot \Sigma^* - R^- \cdot \Sigma^*$$

Specifically, the access control automaton $\Gamma$ is an automaton expressing a regular set of a difference obtained by removing a regular set in which an arbitrary path $\Sigma^*$ is connected after the automaton $R^-$ from a regular set in which an arbitrary path $\Sigma^*$ is connected after the automaton $R^+$.

For example, the automaton $R^+$ for the foregoing guest can be expressed by a regular expression of e|bib.book, and the automaton $R^-$ can be expressed by $\Sigma^*$.price. Thus, the access control automaton $\Gamma$ can be expressed by a regular expression of (e|bib.book)·($\Sigma$−{price})*.

Figure 6:
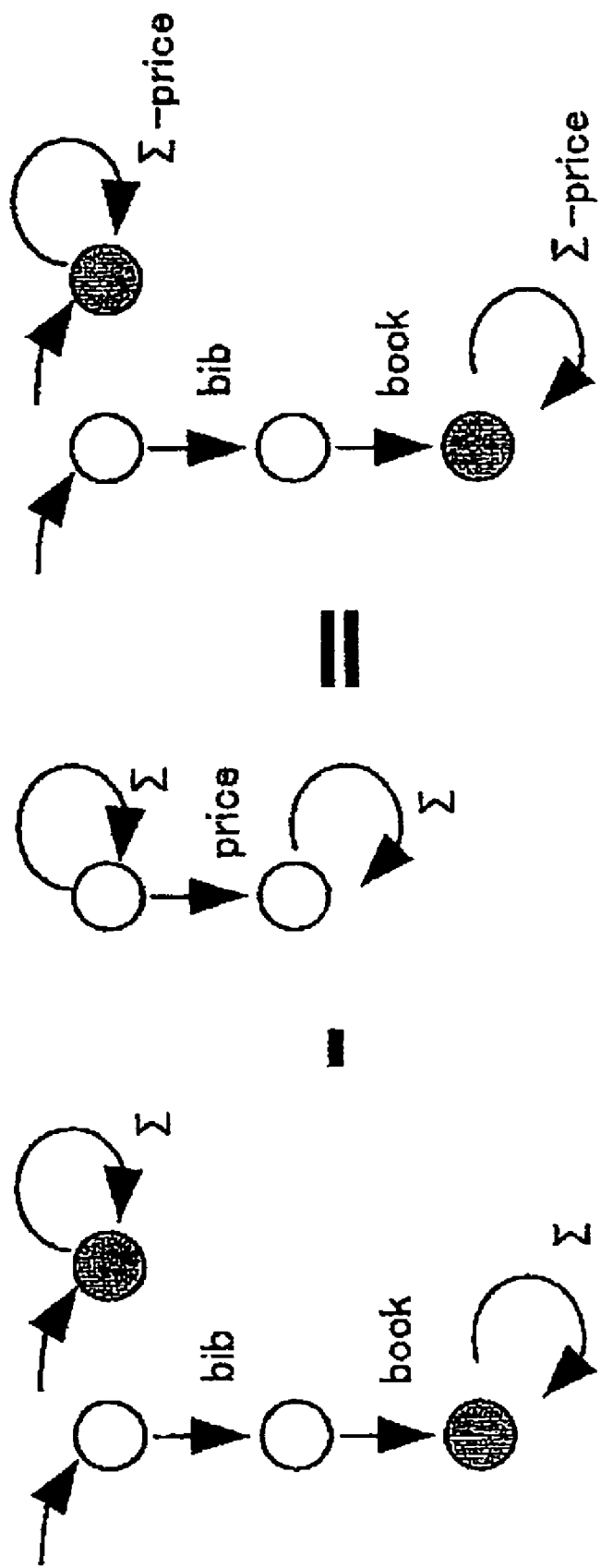
FIG. 6 is a view explaining an access control automaton in the embodiment 1.

FIG. 6 is a view explaining the access control automaton $\Gamma$.

In the access control automaton $\Gamma$ shown in FIG. 6, access decision for an instance of the XML document is performed as below.

In the XML document, GRANT that is a set of nodes (elements, attributes, texts or the like) for which read access is permitted and DENY that is a set of nodes for which no read access right is permitted, can be obtained as follows.

n∈GRANT=>node n is selected by the access control automaton $\Gamma$.

DENY="set of all nodes in a given document"−GRANT

Note that, if the path up to the predetermined node (element, attribute and/or text) n is accepted by the automaton $\Gamma$, this means that the node n is selected by the access control automaton $\Gamma$.

The schema automaton generation unit 230 generates a schema automaton from a description of a schema. The generated schema automaton is retained, for example, in the working space of the main memory 103 shown in FIG. 1 and used by the logic operation unit 240. As the schema for the XML document, DTD, XML Schema, RELAX NG and the like are often used. In this embodiment, description will be given of a case where DTD is used as the schema. However, other cases using other kinds of schemas are basically the same.

Considered is DTD as below.

```
<!ELEMENT bib (book*)>
<!ELEMENT book (title, author*, price)>
<!ELEMENT title (#PCDATA)>
<!ELEMENT author (#PCDATA)>
<!ELEMENT price (#PCDATA)>
```

In this embodiment, considered is an automaton S corresponding to a path regular expression equivalent to an arbitrary path permitted by this DTD. This automaton S accepts paths from roots for any nodes of any XML documents permitted by this DTD and does not accept paths other than the above paths. This automaton S is the schema automaton.

An algorithm for obtaining the schema automaton S upon receiving DTD will be described below.

First, a state transition of the schema automaton S is obtained. A state for each element name n is assumed to be qn. In the case where there is an element declaration such as <!ELEMENT n ( . . . )>, if an element name m appears in ( . . . ), the element name n and the state qn are given and a transition to qm is added to the schema automaton S. When the above processing is performed for all element declarations, the state transition of the schema automaton S is obtained. An initial state of the schema automaton S is a state corresponding to an element name of a root. Moreover, a final state set of the schema automaton S is the all states.

For example, from the foregoing DTD, the schema automaton S corresponding to the regular expression of bib.(e|book.(e|title|author|price)) is obtained.

The logic operation unit 240 uses the respective automatons generated by the foregoing query automaton generation unit 210, access control automaton generation unit 220 and schema automaton generation unit 230 and decides the propriety of access to desired nodes of the XML document by the given path expression. The contents to be decided here are the following two properties.

always denied: whether or not access to all nodes retrieved by the query automaton q is denied.

always permitted: whether or not access to all nodes retrieved by the query automaton q is permitted.

When the logic operation unit 240 fails to decide both "always permitted" and "always denied", the logic operation unit 240 outputs a result of "indeterminate".

In order to decide "always permitted" or "always denied", the following points may be checked (note that q is the query automaton, $\Gamma$ is the access control automaton and S is the schema automaton).

"always denied" q and $\Gamma \cap S$ are disjoint

"always permitted" q∩S is included in $\Gamma$

Here, X∩Y means a product set of X and Y. X and Y are disjoint means that X3Y is a null set. To be included means inclusion $\subseteq$ of the set. All operations for these automatons can be calculated, for example, by use of existing techniques, see, for example, J. Hopcroft/J. Ullman, "Information & Computing (3) and (4)", Science, 1986

A common part between the query automaton q corresponding to the above-described XPath expression //author and the schema automaton S in DTD is an automaton corresponding to bib.book.author. This is included in the access control automaton $\Gamma$ for Guest in the above-described access control policy. Thus, the XPath expression //author is decided to be "always permitted".

Meanwhile, as to the query automaton q corresponding to the above-described XPath expression /bib/book/*, the schema automaton S and the access control automaton $\Gamma$ are applied. Consequently, obtained is a result as below.

First, q∩S is an automaton corresponding to bib.book.(author|title|price). The access control automaton $\Gamma$ does not include this automaton. Next, S∩$\Gamma$ corresponds to e|bib.(e|book.(e|title|author)). This automaton has a common part with an automaton of bib.book.S. Thus, the XPath expression /bib/book/* is not either "always permitted" or "always denied" but is "indeterminate".

As a supplementary explanation, description will be given of why the above-described decision rules are correct.

<Decision Rule of "Always Denied">
If "q and Γ∩S are disjoint", then "set of nodes retrieved by q' DENY"

As to the set GRANT, the following property described above is used.

1. n∈GRANT<=>node n is retrieved by Γ.

Now, the schema automaton S is assumed to accept the paths for all the nodes of the document. Accordingly, 2. node n is retrieved by Γ=>node n is retrieved by G∩S.

From 1 and 2, it is clear that, if n c GRANT, the node n is retrieved by G∩S. Therefore, if "q and Γ∩S are disjoint", the nodes retrieved by q are not retrieved by G∩S and thus are not GRANT.

Consequently, if the decision by the foregoing rule of "always denied" is succeeded, it is found out that the retrieval result by the query automaton q is always included in the set DENY.

Figure 7:
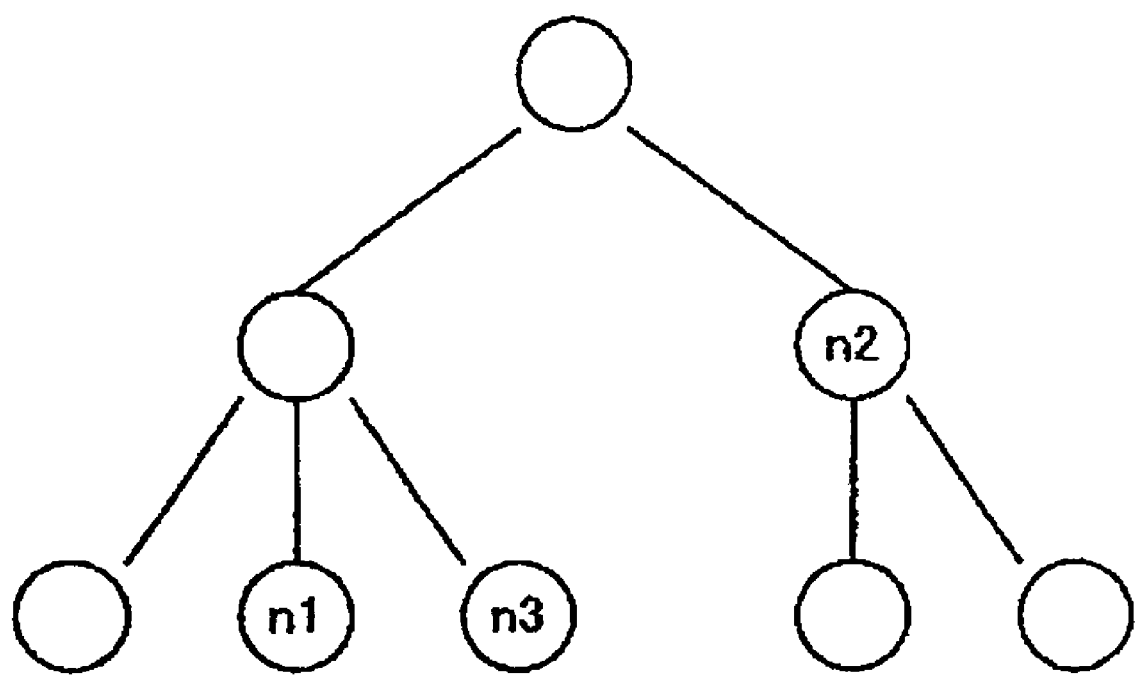
FIG. 7 is a view explaining a decision rule of "always denied" in the embodiment 1.

FIG. 7 is a view explaining the decision rule of "always denied".

In FIG. 7, the node n1 is a node retrieved by the query automaton q and the nodes n2 and n3 are nodes retrieved by the access control automaton Γ. Specifically, the node retrieved by the query automaton q is not included in the nodes retrieved by the access control automaton G and thus is always DENY.

Decision Rule of "Always Permitted"
If "q∩S is included in Γ", then "set of nodes retrieved by q' GRANT".

If q∩S is included in Γ, the node n that is n∈q∩S is retrieved by the access control automaton Γ and thus is clearly GRANT.

Therefore, if the decision by the foregoing rule of "always permitted" is succeeded, it is found out that the retrieval result by the query automaton q is always included in the set GRANT.

Here, the foregoing decision of "always permitted" cannot use the fact that the retrieval for a part transmitted upward from the access control automaton G is "always permitted". Note that it is possible to adopt a technique using this fact.

As described above, according to this embodiment, for an XML document in an XML database, prior to the access rights analysis (access rights check by the unit of node) which performed by actually checking the structure of the XML document in the XML database, to which one of "always permitted", "always denied" and "indeterminate" an access right of a path expression used for database retrieval at least corresponds is determined.

In the case of "always permitted", in the database retrieval using the path expression, it is not required to perform the regular access rights analysis, which is performed by checking the XML document, in the XML database.

In the case of "always denied", it is found out beforehand that the database retrieval itself, which uses the path expression, is invalid.

Therefore, only in the case where the decision result according to this embodiment is "indeterminate", the regular access rights analysis performed by checking the XML document may be executed in the XML database. Thus, an execution efficiency in the entire processing of the database retrieval can be improved.

In this embodiment, description has been given above of the access rights analysis which decides the propriety of access to the predetermined path expression q by use of the access control automaton Γ and the schema automaton S. Incidentally, among XML documents, there exists one in which DTD or other schemas are not specified. In such a case, the schema automaton S is regarded as an automaton corresponding to S* (repetition of an arbitrary element name by an optional number of times). Thus, the above-described access rights analysis of this embodiment can be applied.

Embodiment 2

In the foregoing embodiment 1, the access control automaton Γ is generated from the access control policy, the schema automaton S is generated from the schema and the propriety of access to the predetermined path expression q is decided by use of these access control automaton Γ and the schema automaton S.

Meanwhile, in embodiment 2, an access rights analysis is performed by using a path table instead of the description of the schema such as DTD.

Here, the path table is a data structure storing paths from roots to all nodes (elements, attributes, texts or the like) which exist in an XML document stored in an XML database. In other words, the path table is a list describing all paths in the XML document in the XML database. Note that, in this embodiment, only elements are handled as the nodes.

For example, considered is a case of constructing a path table for the following XML document.

```
<foo a0="">
    <bar a1="">
        <hoge a2="">text</hoge>
    </bar>
    <bar a3=""/>
</foo>
```

All paths included in this XML document are enumerated as below (note that a path having an empty text at its end is omitted).

```
/foo
/foo/@a0
/foo/bar
/foo/bar/@a1
/foo/bar/@a3
/foo/bar/hoge
/foo/bar/hoge/text( )
/foo/bar/hoge/@a2
```

The path table is obtained with these paths as a record. Note that the name having @ at its top represents an attribute.

Similarly to the above-described embodiment 1, an access rights analysis device according to this embodiment is realized by the computer device and the like shown in FIG. 1.

Figure 8:
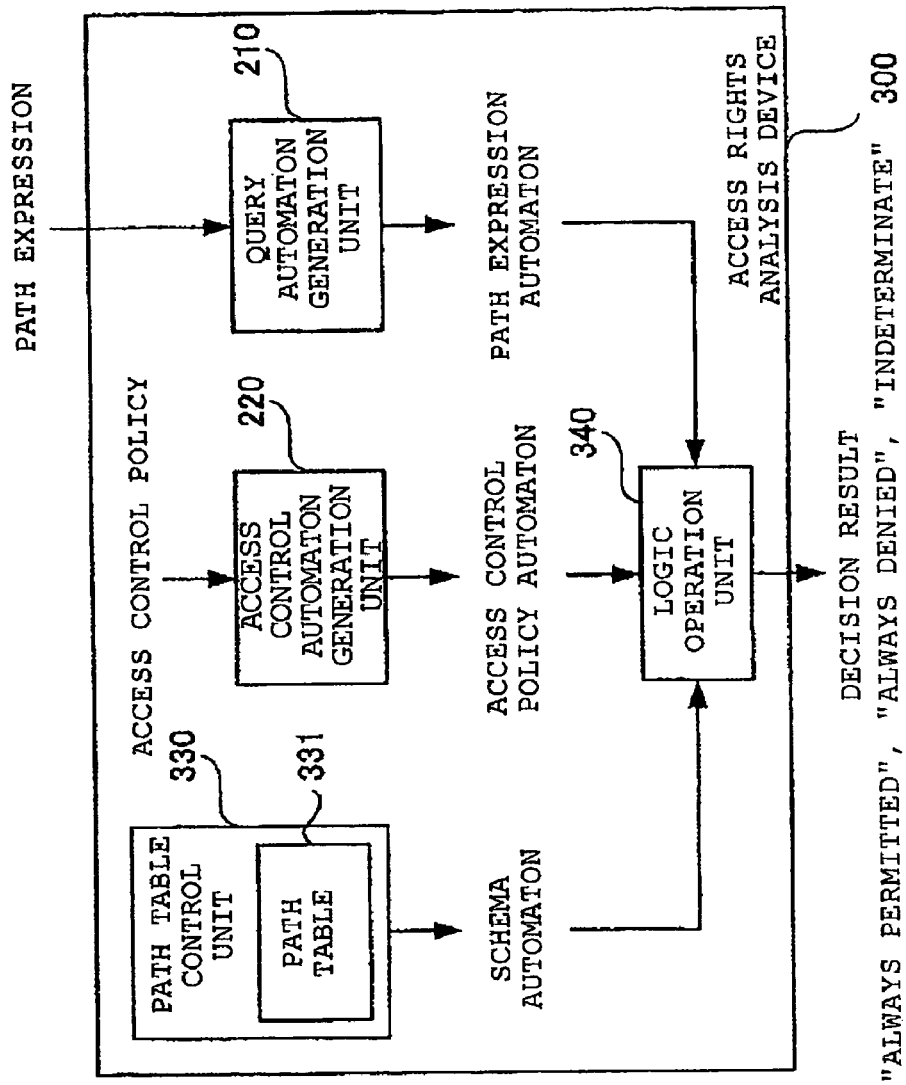
FIG. 8 is a block diagram showing a functional configuration of an access rights analysis device according to embodiment 2.

FIG. 8 is a block diagram showing a functional configuration of the access rights analysis device according to this embodiment.

As shown in FIG. 8, the access rights analysis device 300 according to this embodiment includes: a query automaton generation unit 210 for generating a query automaton from a path expression; an access control automaton generation unit 220 for generating an access control automaton from an access control policy; a path table control unit 330 for controlling a path table 331 of an XML document to be retrieved; and a logic operation unit 340, as an access right decision unit, for performing an access right decision by use of these automatons.

Among these constituent components, the query automaton generation unit 210 and the access control automaton generation unit 220 are the same as the query automaton generation unit 210 and the access control automaton generation unit 220 in the embodiment 1 and thus those components are denoted by the same reference numerals and description thereof will be omitted.

The path table control unit 330 is realized, for example, by the program-controlled CPU 101 and the storage means such as the main memory 103 and the hard disk 105, all of which are shown in FIG. 1, and stores and controls the above-described path table 331 prepared regarding the XML document stored in the XML database. The path table 331 is previously prepared by analyzing the XML document in the XML database by use of a well-known analysis means. However, the path table is accordingly updated along with a change in the contents of the XML database.

FIG. 9 is a view showing an example of the path table 331 prepared for the XML document shown in FIG. 3.

In the path table 331 of FIG. 9, all paths in the XML document of FIG. 3 are enumerated.

By use of the automatons generated by the query automaton generation unit 210 and the access control automaton generation unit 220 and the path table 331 stored in the path table control unit 330, the logic operation unit 340 decides the propriety of access to desired nodes of the XML document by the given path expression. The contents to be decided here are the following two properties.

always denied: whether or not access to all nodes retrieved by the query automaton q is denied.

always permitted: whether or not access to all nodes retrieved by the query automaton q is permitted.

When the logic operation unit 340 fails to decide both "always permitted" and "always denied", the logic operation unit 340 outputs a result of "indeterminate".

When the path table 331 exists for the XML database, the access rights analysis can be performed by referring to only this path table 331, without generating the schema automaton. For example, considered is a case of performing retrieval by XPath of /bib. It is assumed that the path table 331 of FIG. 9 is given, an access control policy is described as below in XACL2 (note that +r is grant read and −r is deny read)

(Admin, /, +r)
(Guest, /bib/book, +r)
(Guest, //price, −r)

and a subject is Guest.

In order to perform the access rights analysis by use of only the path table 331 without using the schema automaton, for example, adoptable is a technique of previously registering information indicating how each entry of the path table 331 is decided in access control (hereinafter referred to as decision information) and performing a decision according to this information.

FIG. 10 is a view showing a state where the decision information of the access control is registered in the path table 331 of FIG. 9.

In the path table 331 shown in FIG. 10, entries selected by the access control automaton Γ are the following three: /bib/book, /bib/book/title and /bib/book/author. At this moment, if +r indicating grant read to all the entries (=q3S) retrieved by the query automaton /bib is added to the query automaton /bib, the decision result is "always permitted".

On the contrary, if −r indicating deny read is added to all the path table entries retrieved by the query automaton, this means that the decision of "q and Γ∩S are disjoint" is succeeded and thus the decision result is "always denied".

If +r indicating grant read and −r indicating deny read are mixed in all the path table entries retrieved by the query automaton, the decision result becomes "indeterminate".

In the foregoing technique of the access rights analysis, the propriety of access is decided based on only the information in the path table 331 without generating the schema automaton. Alternatively, it is also possible to perform the access rights analysis not by previously registering the information in the path table 331 but by generating the schema automaton from the entries of the path table 331.

Specifically, for the XML document in the XML database, if the path table 331 as shown in FIG. 9 is previously prepared from the contents of the document, all the XML documents are restricted by paths existing in this path table 331. Thus, this path table 331 can be used as the schema automaton.

In this case, a schema automaton generation unit is further provided in the access rights analysis device 300 of this embodiment shown in FIG. 8. The schema automaton generation unit reads the path table 331 from the path table control unit 330, generates the schema automaton and sends the schema automaton to the logic operation unit 340.

In order to generate the schema automaton from the path table 331, a technique of preparing automatons corresponding to the respective paths of the path table 331 and obtaining the sum thereof can be adopted. To be specific, if the path is /bib/book/title, an automaton corresponding to the regular expression of bib.book.title is prepared. Thereafter, the sum of the respective automatons may be obtained by an existing technique.

As described above, according to this embodiment, similarly to the embodiment 1, for an XML document in an XML database, prior to the access rights analysis (access rights check by the unit of node) which is performed by actually checking the structure of the XML document in the XML database, to which one of "always permitted", "always denied" and "indeterminate" an access right of a path expression used for database retrieval at least corresponds is determined.

Therefore, only in the case where the decision result according to this embodiment is "indeterminate", the regular access rights analysis performed by checking the XML document may be executed in the XML database. Thus, an execution efficiency in the entire processing of the database retrieval can be improved.

Embodiment 3

In the foregoing embodiments 1 and 2, description was given of the access rights analysis using the path expression such as XPath and the like as the description of the retrieval conditions. Meanwhile, in embodiment 3, description will be given of an access rights analysis using a query expression including the path expression.

Here, the query expression is an expression specifying retrieval for an XML database. Nodes are found by the path expression and some kind of operation is performed for the nodes (such as an operation of constructing a new XML document by adding some elements). XQuery of W3C is the query expression. XQuery uses XPath to express the path expression. In this embodiment, description will be given of an example in which XQuery is used as the query expression.

Similarly to the above-described embodiment 1, an access rights analysis device according to this embodiment is realized by the computer device shown in FIG. 1 and the like.

Figure 11:
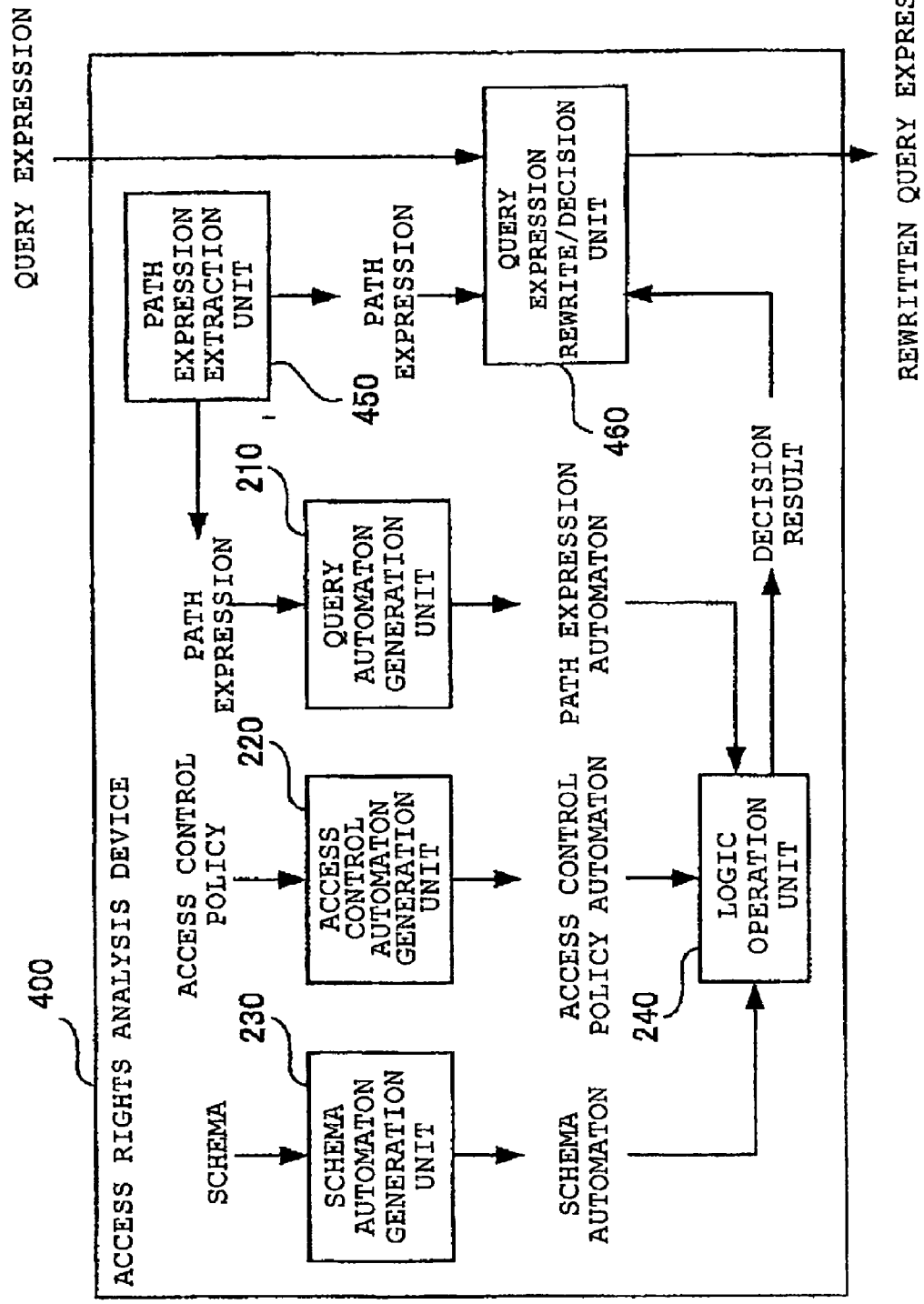
FIG. 11 is a block diagram showing a functional configuration of an access rights analysis device according to embodiment 3.

FIG. 11 is a block diagram showing a functional configuration of the access rights analysis device according to this embodiment.

As shown in FIG. 11, the access rights analysis device 400 according to this embodiment includes: a query automaton generation unit 210 for establishing a query automaton from a path expression; an access control automaton generation unit 220 for generating an access control automaton from an access control policy; a schema automaton generation unit 230 for generating a schema automaton from a schema; a logic operation unit 240 for performing an access right decision for individual path expressions by use of these automatons; a path expression extraction unit 450 for extracting a path expression from a query expression; and a query expression rewriting/decision unit 460 for performing an access right decision of the query expression itself based on a decision result obtained by the logic operation unit 240.

Among these constituent components, the query automaton generation unit 210 and the access control automaton generation unit 220, the schema automaton generation unit 230 and the logic operation unit 240 are the same as the corresponding constituent components in the embodiment 1 and thus those components are denoted by the same reference numerals and description thereof will be omitted.

The path expression extraction unit 450 extracts a path expression by analyzing a query expression such as XQuery and sends the obtained path expression to the query automaton generation unit 210. As the path expression extraction unit 450, for example, a general-purpose syntax analysis device realized by the program-controlled CPU 101 shown in FIG. 1 or a syntax analysis device dedicated to XQuery can be used.

FIG. 12 is a view showing an example of the query expression (XQuery).

In the case of the query expression of FIG. 12, respective instructions are interpreted and executed as below. This technique is an existing well-known technology (for example, refer to "XQuery 1.0: An XML Query Language", [online], Apr. 30, 2002, W3C Working Draft, [searched on January 29, Heisei 15], Internet <URL: HYPERLINK "http://www.w3.org/TR/2002/WD-xquery-20020430/"http://www.w3.org/TR/xquery/>).

The first and eight to nine lines are actions of surrounding the entire retrieval result by <bib> . . . </bib>.

The sentense starting with "for" (hereinafter referred to as the "for" sentence) in the second line is an action of repeating actions of the third to seventh lines for each node selected by /bib/book with respect to an XML document specified by http://www.bn.com.

The sentense starting with "where" in the third line indicates that, when each node selected by the "for" sentence is set to $b, a text value of $b/publisher is "Addison-Wesley" and when a value of $b/@year is 1991 or more, actions of the fourth to eighth lines are performed.

The fourth to seventh lines indicate actions of preparing a book element in which, for each node $b selected by the "for" sentence, only its @year value and title are copied.

/bib/book, $b/publisher and the like in the above-described actions are the path expressions (XPath).

FIG. 13 is a table showing a list of the path expressions extracted from the query expression of FIG. 12.

In FIG. 13, attention should be given to the point that, between document ( . . . )/bib/book of the second line and document ( . . . )/bib/book/title of the sixth line, the way of evaluating XPath is different. In the former one, contents of a descendant of the book element are not asked and each book element itself may be just counted up by the "for" sentence. The title element of the sixth line is a retrieval result and thus the entire contents including descendant nodes are asked. Specifically, even if access to /bib/book/price is denied, there is no influence on the execution of the "for" sentence. However, if access to /bib/book/title/subtitle is prohibited, access control is required for execution of the "return" sentence.

Such a difference in the way of evaluating XPath is shown in FIG. 13 by classifying into two groups, group A and B. The path expression corresponding to the "for" sentence is classified as the group A and the path expression is classified as the group B in the case of viewing the contents of the descendant nodes such as the "return" sentence. Moreover, when a text value of a result of a certain XPath expression is a problem, such as $b/publisher="Addison Wesley", the path expression is classified as the group B.

The classification of the XPath expressions appropriate for the respective groups A and B is as follows.

Group A: XPath Expression with No Need to Consider Descendants

Ex1: Location designator, XPath expression of an element appearing in "for".

Ex2: Attribute, XPath expression of an attribute expected to appear at various spots.

Ex3: Location designator, XPath expression of an element expected to appear at various spots (/test/xml and /test/. in /test[.follows xml]).

Ex4: Location designator, XPath expression of an element expected to appear at various spots (/test in namespace-uri(./test)='http://uri').

Group B: XPath Expression Including a Meaning of Access to Descendant Nodes

Ex1: XPath expression of an element appearing in "return" (in the case of considering subtree of a certain element and the like).

Ex2: XPath expression of an element referring to text value (which is expected to appear at various spots) (/test/xml of /test[./xml='ABC']).

The query automaton is generated by the query automaton generation unit 210 for each path expression q extracted from the query expression and is inputted to the logic operation unit 240 together with the respective automatons generated by the access control automaton generation unit 220 and the schema automaton generation unit 230. Thereafter, the access rights analysis is performed and the decision of "always permitted", "always denied" or "indeterminate" is executed as below.

The decision of "always denied" is directly applied to the path expression q irrespective of the groups A and B.

The decision of "always permitted" is directly applied to the path expression q when the path expression q belongs to the group A and is transformed into q.S* before being applied to the path expression q when the path expression q belongs to the group B.

The path expression q failed in the decision of both "always denied" and "always permitted" is judged to be "indeterminate".

These decision results are retained, for example, in the working space of the main memory 103 of FIG. 1.

The reason why the decision is performed as described above is as follows.

"The path expression q of the group A is always denied" means "access to all the nodes in the retrieval result of the path expression q is denied". In addition, "the path expression q of the group B is always denied" means "access to all the nodes in the retrieval result of the path expression q is denied and its descendant nodes cannot be viewed, either". However, in the description of the access control policy in XACL, if access to a predetermined node is prohibited, its descendant cannot be viewed, either. Thus, regarding "always denied", there is no difference between the groups A and B.

Meanwhile, regarding "always permitted", "the path expression q of the group A is always permitted" means "access to all the nodes in the retrieval result of the path expression q is permitted". On the contrary, "the path expression q of the group B is always permitted" means "access to all the nodes in the retrieval result of the path expression q is permitted and all of its descendant nodes can be also viewed". Thus, there is a difference between groups A and B. In the case of the group B, in order to guarantee the permission to access to all the descendant nodes, the access right decision must be succeeded for all the nodes retrieved by q. $\Sigma^*$. Therefore, it is required to take the decision technique as described above.

FIG. 14 is a table showing results of access rights analyses (decision results) for individual path expressions extracted from the query expression of FIG. 12.

The query expression rewriting/decision unit 460 performs decision of the propriety of access to the query expression itself from the decision results obtained as shown in FIG. 14 for the individual path expressions.

The query expression rewriting/decision unit 460 first substitutes a value indicating a null set ($empty herein) for the path expression decided to be "always denied".

FIG. 15 is a view showing a state where the rewriting is performed for the query expression of FIG. 12.

The path expressions remaining in this query expression are all "always permitted". In general, when all path expressions included in a query expression are "always permitted" or "always denied" but not "indeterminate", the query expression can be rewritten so as to include only the path expressions that are "always permitted". This is because, as to the path expressions that are "always denied", database retrieval itself, which uses the path expressions, becomes invalid in first place.

Therefore, such a query expression is decided to be "always permitted" by the query expression rewriting/decision unit 460 and the evaluation thereof can be executed without performing a dynamic access control in execution. When the query expression includes the path expression decided to be "indeterminate", the query expression itself is decided to be "indeterminate" by the query expression rewriting/decision unit 460.

As described above, from the query expression rewriting/decision unit 460, the query expression rewritten according to need and the decision result of "always permitted" or "indeterminate" are outputted.

Figure 16:
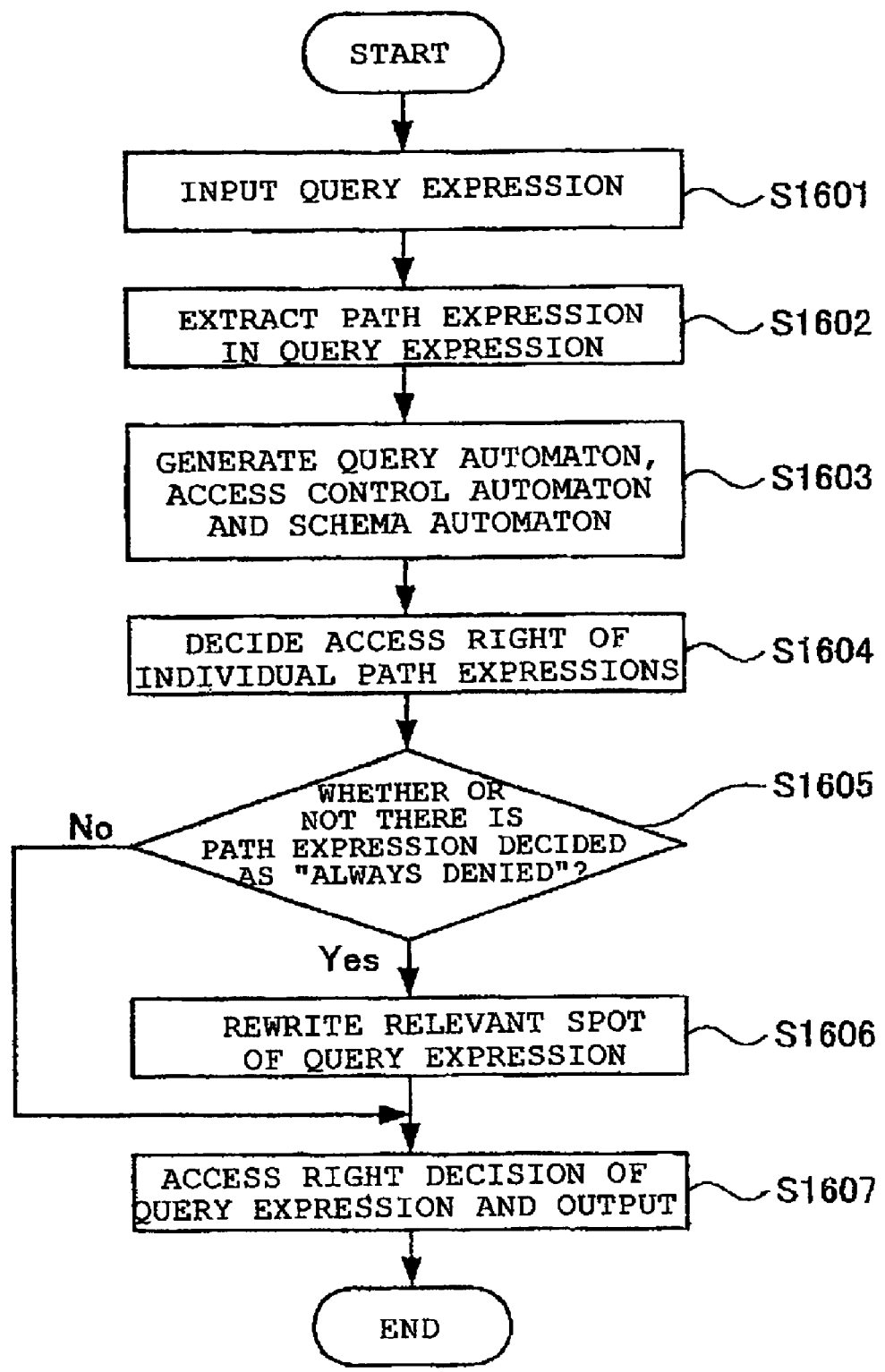
FIG. 16 is a flowchart explaining an operation of the access rights analysis device according to the embodiment 3.

FIG. 16 is a flowchart explaining an operation of the access rights analysis device 400 according to this embodiment.

As shown in FIG. 16, when a query expression to be processed is inputted to the access rights analysis device 400 (Step 1601), path expressions in the query expression are first extracted by the path expression extraction unit 450 (Step 1602). Thereafter, a query automaton is generated by the query automaton generation unit 210, an access control automaton is generated by the access control automaton generation unit 220 and a schema automaton is generated by the schema automaton generation unit 230 (Step 1603).

Next, by use of the respective automatons generated, the logic operation unit 240 decides access rights of the individual path expressions extracted from the query expression (Step 1604).

Next, based on these access right decision results of the individual path expressions, the query expression rewriting/decision unit 460 decides the access right of the query expression.

First, when there is a path expression decided to be "always denied", the path expression is rewritten as a value indicating a null set (Steps 1605 and 1606). Thereafter, based on the decision results of all the path expressions, the query expression is decided to be "always permitted" or "indeterminate" and this decision result is outputted together with the rewritten query expression (Step 1607). The outputted decision result and query expression are handed over to the XML database and the database retrieval by the query expression is performed immediately or after performing the access rights analysis in accordance with the decision results.

As described above, according to this embodiment, for an XML document in an XML database, prior to the access rights analysis (access rights check by the unit of node) which is performed by actually checking the structure of the XML document in the XML database, to which one of "always permitted" and "indeterminate" an access right of a path expression used for database retrieval at least corresponds is determined.

In the case of "always permitted", in the database retrieval using the path expression, it is not required to perform the regular access rights analysis, which is performed by checking the XML document, in the XML database.

Therefore, only in the case where the decision result according to this embodiment is "indeterminate", the regular access rights analysis performed by checking the XML document may be executed in the XML database. Thus, an execution efficiency in the entire processing of the database retrieval can be improved.

Note that, instead of rewriting the query expression as described above, it is possible to use the decision of "always permitted" or "always denied" for each path expression in executing interpretation of the query expression. In this case, an interpretation execution system of a query expression is assumed to be realized by combining evaluation results of an access rights analysis device for path expressions. When retrieving a retrieval result for a path expression of "always permitted", this access rights analysis device does not perform a runtime access control for a database and does not need to perform retrieval itself for a path expression of "always denied".

In this embodiment, as to the access rights analysis device 400, description was given of the constitution obtained by adding the path expression extraction unit 450 and the query expression rewriting/decision unit 460 to the access rights analysis device 200 of the embodiment 1. However, it is needless to say that the access rights analysis device can also have a constitution obtained by adding the path expression extraction unit 450 and the query expression rewriting/decision unit 460 to the access rights analysis device 300 of the embodiment 2, which does not perform generation of the schema automaton. In this case, the access rights analysis device 400 includes the query automaton generation unit 210, the access control automaton generation unit 220, the path table control unit 330 and the logic operation unit 340, as shown in FIG. 8, and further includes the path expression extraction unit 450 and the query expression rewriting/decision unit 460.

As to the operation of the access rights analysis device 400, the generation of the schema automaton is not performed in the foregoing Step 1603. Moreover, in Step 1604, the decision of "always permitted", "always denied" or "indeterminate" is performed for the individual path expressions by use of the path table instead of the schema automaton. This operation is the same as that of the embodiment 2. Other operations are the same as those described above.

Embodiment 4

In embodiments 4 and 5, the access rights analysis devices 200, 300 and 400 described in the embodiments 1 to 3 will be described. In the embodiments 1 to 3, description was given of a static decision technique in the case where a subject receiving access control is given. However, in an actual execution environment, the subject of the access control is dynamically determined. Therefore, including specification of the subject, an access rights analysis device implemented in a database retrieval system will be described.

With regard to timing of executing the access rights analysis for a query expression, a system which performs the access rights analysis "immediately before execution" of the database retrieval and a system which performs the access rights analysis "during compiling" of the query expression are conceivable. In the embodiment 4, the system which performs the analysis "immediately before execution" will be described.

Figure 17:
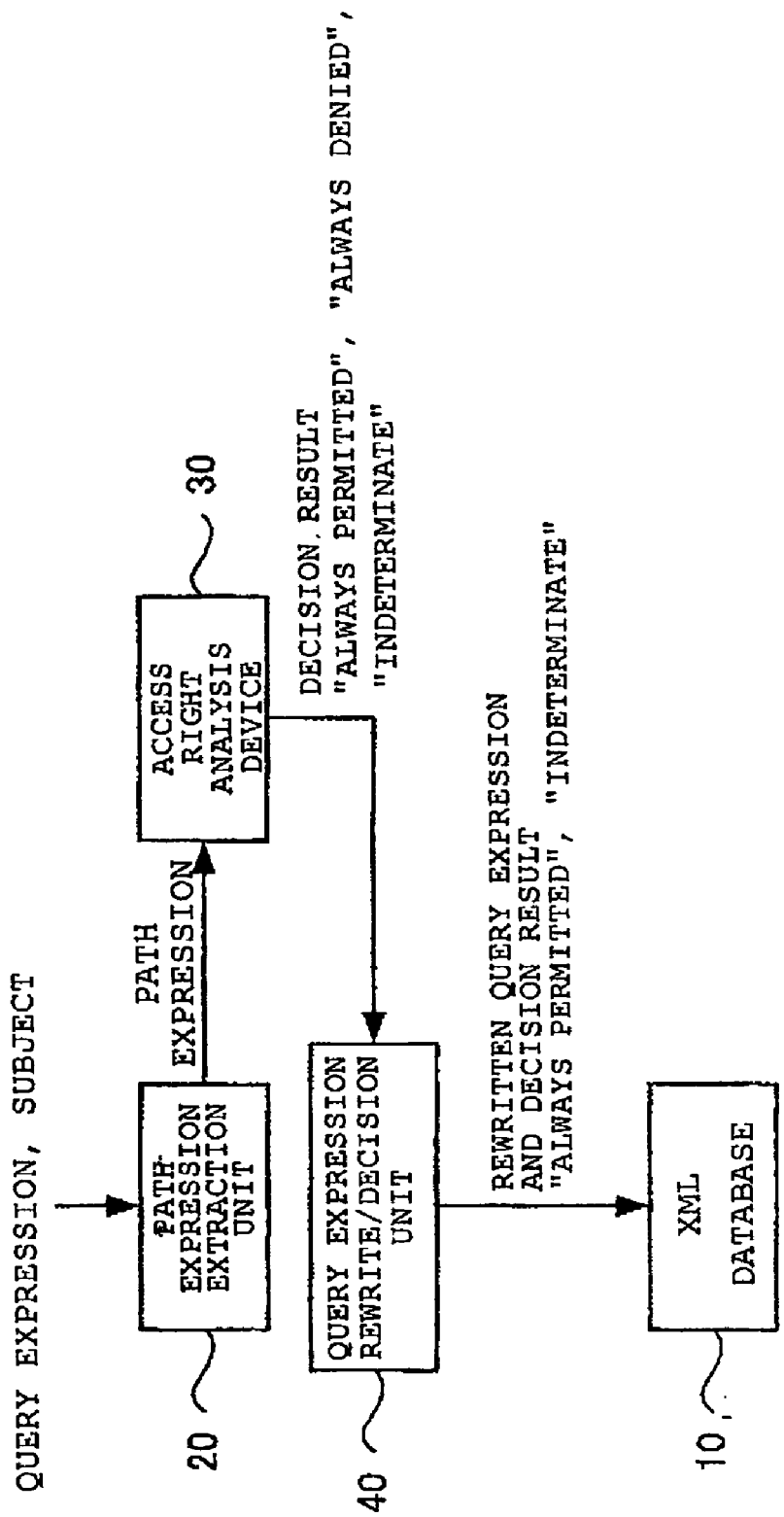
FIG. 17 is a view showing a constitution example of a database retrieval system performing an access rights analysis "immediately before the execution" according to embodiment 4.

FIG. 17 is a view showing a constitution example of a database retrieval system which performs an access rights analysis "immediately before the execution" of the database retrieval.

Referring to FIG. 17, the database retrieval system according to this embodiment includes: an XML database 10 storing an XML document to be retrieved; a path expression extraction unit 20 for extracting a path expression (XPath) by inputting a query expression (XQuery) showing a retrieval condition; an access rights analysis device 30 which determines the right of access to the XML database 10 by use of the path expression extracted by the path expression extraction unit 20; and a query expression rewriting/decision unit 40 for deciding an access right of the query expression as well as rewriting a query expression according to an analysis result of the access rights analysis device 30.

As this access rights analysis device 30, any one of the access rights analysis devices 200 and 300 described in the embodiments 1 and 2 can be used. Moreover, the path expression extraction unit 20 is the same as the path expression extraction unit 450 described in the embodiment 3, and the query expression rewriting/decision unit 40 is the same as the query expression rewriting/decision unit 460 described in the embodiment 3. Therefore, combination of the access rights analysis device 30, the path expression extraction unit 20 and the query expression rewriting/decision unit 40 is equivalent to the constitution of the access rights analysis device 400 shown in the embodiment 3.

Incidentally, the system of this embodiment, which performs the access rights analysis immediately before execution of the database retrieval, has such characteristics as below.

When there is a path table, the latest contents can be referred to.

A subject is decided.

Therefore, it is preferable to use the access rights analysis device 300 described in the embodiment 2, which decides the propriety of access to a path expression by use of the path table, as the access rights analysis device 30 of this embodiment.

In the database retrieval system shown in FIG. 17, when a predetermined query expression is inputted in the path expression extraction unit 20, path expressions are extracted from this query expression and sent to the access rights analysis unit 30. In this event, a subject that is a main body of retrieval by the query expression is also specified. Note that processing of extracting the path expressions from the query expression may be performed only once in compiling of the query expression. Thereafter, a table associating the query expression with the extracted path expression group (for example, the table shown in FIG. 13 or FIG. 14) and the like are prepared and controlled. Thus, it is possible to avoid complexity of extracting the path expressions at each time of executing the database retrieval.

After the analysis performed by the access rights analysis device 30, the query expression rewriting/decision unit 40 rewrites a description of the path expression decided to be "always denied" in the query expression. Thereafter, the query expression decided to be "always permitted" or "indeterminate" is sent to the XML database 10.

In the XML database 10, regarding the query expression of which decision result obtained by the query expression rewriting/decision unit 40 is "always permitted", the XML document is immediately retrieved without performing the regular access rights analysis performed by checking the structure of the XML document. Moreover, regarding the query expression of which decision result obtained by the query expression rewriting/decision unit 40 is "indeterminate", the XML document is retrieved after performing the regular access rights analysis performed by checking the structure of the XML document.

In the case of the database retrieval system according to this embodiment, the access rights analysis is performed in the execution of the database retrieval. Thus, for processing, from issuing of a query expression to obtainment of a retrieval result, time longer by just that much is required. However, by previously caching a result of the access rights analysis for a pair of each path expression and the subject, processing performance can be improved (the time required for the processing can be shortened). Note that this cache becomes invalid when the path table is updated and thus is required to be reset at each time of the update.

Embodiment 5

In the embodiment 5, description will be given of the system performing the access rights analysis "in compiling" of the query expression.

Figure 18:
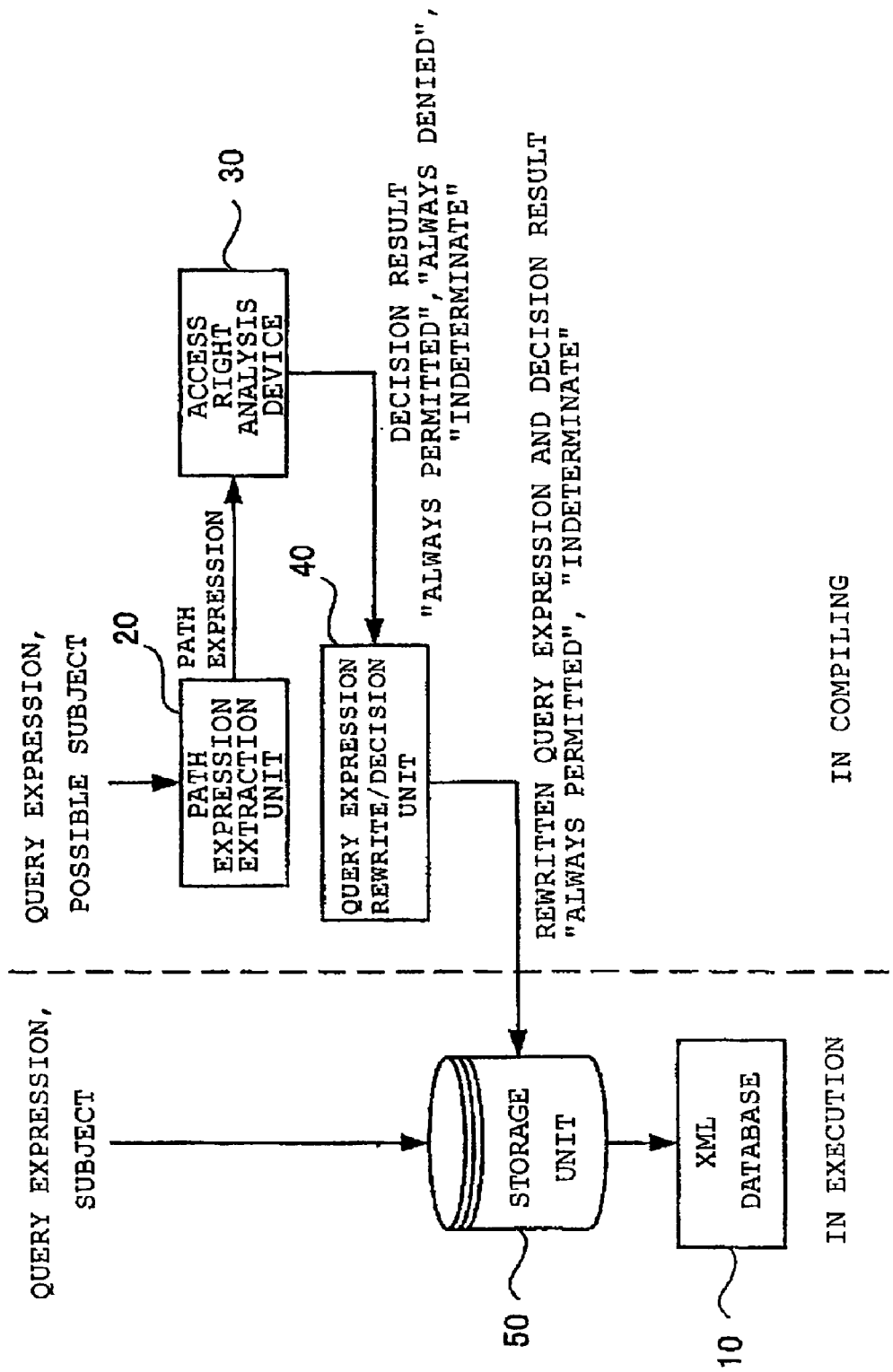
FIG. 18 is a block diagram showing a constitution example of a database retrieval system performing an access rights analysis in the compiling of the query expression according to embodiment 5.

FIG. 18 is a view showing a constitution example of a database retrieval system which performs an access rights analysis in the compiling of the query expression.

Referring to FIG. 18, the database retrieval system according to this embodiment includes: an XML database 10 storing an XML document to be retrieved; a path expression extraction unit 20 for extracting a path expression (XPath) by inputting a query expression (XQuery) showing a retrieval condition; an access rights analysis device 30 which determines the right of access to the XML database 10 by use of a path expression extracted by the path expression extraction unit 20; a query expression rewriting/decision unit 40 for deciding an access right of the query expression as well as rewriting a query expression according to an analysis result of the access rights analysis device 30; and a storage unit 50 for retaining the decision result obtained by the query expression rewriting/decision unit 40.

As this access rights analysis device 30, any one of the access rights analysis devices 200 and 300 described in the embodiments 1 and 2 can be used. Moreover, the fact that the combination of the access rights analysis device 30, the path expression extraction unit 20 and the query expression rewriting/decision unit 40 is equivalent to the constitution of the access rights analysis device 400 shown in the embodiment 3 is similar to the case of the embodiment 4.

The storage unit 50 is a cache memory and is realized by the main memory 103, when, for example, the database retrieval system is configured by the hardware shown in FIG. 1.

The system of this embodiment, which previously performs the access rights analysis in the compiling of the query expression, has characteristics as below.

A path table cannot be used since the path table may be updated even after the access rights analysis.

No subject is decided.

Therefore, it is preferable to use the access rights analysis device 200 described in the embodiment 1, which uses no path table for the decision of the propriety of access, as the access rights analysis device 30 of this embodiment.

In the database retrieval system shown in FIG. 18, when a predetermined query expression is inputted in the path expression extraction unit 20, path expressions are extracted from this query expression and sent to the access rights analysis device 30. Because no subject is specified at this point, various possible subjects are assumed and the access rights analysis is performed by the access rights analysis device 30.

After the analysis performed by the access rights analysis device 30, the query expression rewriting/decision unit 40 rewrites a description of the path expression decided to be "always denied" in the query expression. Thereafter, the query expression decided to be "always permitted" or "indeterminate" is sent to the storage unit 50 and cached.

In the execution of the database retrieval, the propriety of access to the query expression is recognized by use of the access rights analysis result cached in the storage unit 50. Accordingly, regarding the query expression of which decision result is "always permitted", the XML document is immediately retrieved without performing the regular access rights analysis performed by checking the structure of the XML document. Moreover, regarding the query expression of which decision result obtained by the query expression rewriting/decision unit 40 is "indeterminate", the XML document is retrieved after performing the regular access rights analysis performed by checking the structure of the XML document. Note that, when a predetermined query expression issued from a predetermined subject is not hit in the cache, compiling of the query expression is redone.

In the case of the database retrieval system according to this embodiment, since the access rights analysis is performed in the compiling of the query expression, only the decision result cached in the storage unit 50 is referred to in the execution of the database retrieval. Thus, high-speed processing can be realized. However, compared to the embodiment 4, possible subjects must be previously prepared and decision results obtained in all the cases must be retained in the storage unit 50. Thus, usage of a storage capacity in storage means realizing the storage unit 50 is large.

Note that, in the respective embodiments described above, in the query automaton, the access control automaton and the schema automaton, only the paths are handled. The path is simply a sequence and has an advantage that the path is easily handled by an ordinary automaton. However, the structure of the XML document is the tree structure and the schema indicates what kind of tree structure the XML document permits. The XPath retrieval expression used in the description of the access control policy is also generally related to the tree structure and does not handle only the paths. Therefore, it is possible to realize the above-described access rights analysis devices 200, 300, 400 and 30 not by use of the automaton handling the sequences described in the foregoing embodiments but by use of the automaton handling the tree structure.

Moreover, in the foregoing respective embodiments, description was given of the access rights analysis in the XML database retrieval by use of the XML document as a target to be processed. However, it is needless to say that, even in other situations than the database retrieval, when the access rights analysis is widely taking the path expression such as XPath as its condition, the foregoing respective embodiments are applicable.

Furthermore, also in a system taking a structured document other than XML as its target, the foregoing respective embodiments are applicable as long as specifications equivalent to the schema and the access control policy are defined.

As described above, according to the present invention, in the XML database, the access rights analysis is realized without checking the XML document itself or its nodes and the retrieval performance of the XML database can be improved.

We claim:

1. An information processor to analyze the right of access to a database having a data file in a form of a structured document, the information processor comprising:
   a database storing an XML document;
   a preliminary access rights analysis device which decides, based on path expressions describing retrieval conditions used in retrieval for the database and an access control policy describing access control rules, to which one of
   1) always permitted,
   2) always denied, and
   3) indeterminate
   access right in the database retrieval using the path expressions corresponds, said preliminary access rights analysis device deciding said access rights without retrieving said XML document if said access right is always permitted or always denied, and wherein if said access right is indeterminate, then said database retrieval system accessing said XML document to determine an access right;
   a query automaton generation unit for generating a query automaton from a path expression in which a retrieval condition for the database is described, wherein said path expression is extracted from a query requesting access to said database;
   an access control automaton generation unit for generating an access control automaton from an access control policy in which an access control rule is described;
   an operation unit having instructions for deciding access rights in database retrieval using the path expression by performing operations related to the query automaton generated by the query automaton generation unit and the access control automaton generated by the access control automaton generation unit, without accessing said data file stored in said database, said operation unit also having instructions for issuing a decision which allows access, or does not allow access, to said data in response to said query;
   a path expression extraction unit for extracting the path expressions from a query expression specifying a retrieval method for the database; and
   a query expression access right decision unit for deciding access rights in the database retrieval by the query expression based on decision results of access rights, which are obtained by the operation unit, for the individual path expressions extracted from the query expression.

2. The information processor of claim 1, further comprising a schema automaton generation unit for generating a schema automaton from a schema showing a structure of the data file stored in the database wherein the logic operation unit performs decision of the access right in consideration for the schema automaton generated by the schema automaton generation unit.

3. The information processor of claim 2, further comprising a path table control unit for controlling path table describing paths of the data file stored in the database wherein the schema automaton generation unit generates the schema automaton from the path table controlled by the path table control unit.

4. An information processor which analyzes access rights to a database having a data file comprising a structured document, the information processor comprising:
- a database storing an XML document;
- a preliminary access rights analysis device which decides, based on path expressions describing retrieval conditions used in retrieval for the database and an access control policy describing access control rules, to which one of
  1) always permitted,
  2) always denied, and
  3) indeterminate
access right in the database retrieval using the path expressions corresponds, said preliminary access rights analysis device deciding said access rights without retrieving said XML document if said access right is always permitted or always denied, and wherein if said access right is indeterminate, then said database retrieval system accessing said XML document to determine an access right;
- a query automaton generation unit for generating a query automaton from a path expression in which a retrieval condition for the database is described, wherein said path expression is extracted from a query requesting access to said database;
- an access control automaton generation unit for generating an access control automaton from an access control policy in which an access control rule is described;
- an operation unit having instructions for deciding access rights in database retrieval using the path expression by performing operations related to the query automaton generated by the query automaton generation unit and the access control automaton generated by the access control automaton generation unit, without accessing said data file stored in said database, said operation unit issuing a decision which allows access, or does not allow access, to said data in response to said query;
- a path expression extraction unit for extracting the path expressions from a query expression specifying a retrieval method for the database;
- a query expression access right decision unit for deciding access rights in the database retrieval by the query expression based on decision results of access rights, which are obtained by the operation unit, for the individual path expressions extracted from the query expression;
- a path table control unit for controlling a path table describing paths of a data file stored in the database;
- an access right decision unit for selecting a predetermined path in the path table controlled by the path table control unit by a path expression describing a retrieval condition for the database, applying an access control policy describing access control rules and deciding an access right in database retrieval by the path expression with respect to the predetermined path;
- a path expression extraction unit for extracting the path expressions from a query expression specifying a retrieval method for the database; and
- a query expression access right decision unit for deciding access rights in the database retrieval by the query expression based on decision results of access rights, which are obtained by the access right decision unit, for the individual path expressions extracted from the query expression, said selecting, applying, deciding, extracting, and deciding being performed prior to retrieving said structured document in said database.

5. A database retrieval system, comprising:
- a database storing an XML document;
- a preliminary access rights analysis device which decides, based on path expressions describing retrieval conditions used in retrieval for the database and an access control policy describing access control rules, to which one of
  1) always permitted,
  2) always denied, and
  3) indeterminate
access right in the database retrieval using the path expressions corresponds, said preliminary access rights analysis device deciding said access rights without retrieving said XML document if said access right is always permitted or always denied, and wherein if said access right is indeterminate, then said database retrieval system accessing said XML document to determine an access right;
- a query automaton generation unit for generating a query automaton from a path expression in which a retrieval condition for the database is described, wherein said path expression is extracted from a query requesting access to said database;
- an access control automaton generation unit for generating an access control automaton from an access control policy in which an access control rule is described;
- an operation unit having instructions for deciding access rights in database retrieval using the path expression by performing operations related to the query automaton generated by the query automaton generation unit and the access control automaton generated by the access control automaton generation unit, without accessing said data file stored in said database, said operation unit issuing a decision which allows access, or does not allow access, to said data in response to said query;
- a path expression extraction unit for extracting the path expressions from a query expression specifying a retrieval method for the database; and
- a query expression access right decision unit for deciding access rights in the database retrieval by the query expression based on decision results of access rights, which are obtained by the operation unit, for the individual path expressions extracted from the query expression.

6. The database retrieval system of claim 5, further comprising the access rights analysis device including:
- a path table control unit for controlling a path table describing paths of a data file stored in the database; and
- an access right decision unit for selecting a predetermined path in the path table controlled by the path table control unit by a path expression describing a retrieval condition for the database, applying the access control policy describing the access control rules and deciding an access right in database retrieval by the path expression with respect to the predetermined path.

7. An access rights analysis method for analyzing the right of access to a database storing an XML document by use of a computer, comprising the steps of:

storing an XML document in a database;

deciding, based on path expressions describing retrieval conditions used in retrieval for the database and an access control policy describing access control rules, to which one of
1) always permitted,
2) always denied, and
3) indeterminate access right in the database retrieval using the path expressions corresponds, using a preliminary access rights analysis device, said preliminary access rights analysis device deciding said access rights without retrieving said XML document if said access right is always permitted or always denied, and wherein if said access right is indeterminate, then said database retrieval system accessing said XML document to determine an access right;

generating a query automaton from a path expression in which a retrieval condition for the database is described, generating an access control automaton from an access control policy in which an access control rule is described and storing the generated query automaton and access control automaton in a predetermined storage means, the path expression being derived from a received query;

performing operations related to the query automaton and the access control automaton, which are stored in the predetermined storage means, and deciding an access right in database retrieval using the path expression without checking the XML documents stored in the database, and issuing a decision allowing access or not allowing access to said database;

extracting the path expressions from a query expression specifying a retrieval method for the database using a path expression extraction unit; and deciding access rights in the database retrieval by the query expression based on decision results of access rights for the individual path expressions extracted from the query expression using a query expression access right decision unit.

8. A computer readable medium encoded with a computer program for analyzing the right of access to a database handling a data file as a structured document, by controlling a computer, the program causing the computer to function as:

a database storing an XML document;

a preliminary access rights analysis device which decides, based on path expressions describing retrieval conditions used in retrieval for the database and an access control policy describing access control rules, to which one of
1) always permitted,
2) always denied, and
3) indeterminate access right in the database retrieval using the path expressions corresponds, said preliminary access rights analysis device deciding said access rights without retrieving said XML document if said access right is always permitted or always denied, and wherein if said access right is indeterminate, then said database retrieval system accessing said XML document to determine an access right;

a query automaton generation means for generating a query automaton from a path expression in which a retrieval condition for the database is described, wherein said path expression is extracted from a query requesting access to said database;

an access control automaton generation means for generating an access control automaton from an access control policy in which an access control rule is described;

an operation means with instructions for deciding access rights in database retrieval using the path expression by performing operations related to the generated query automaton and access control automaton, without accessing said data file, said operation means also having instructions for issuing a decision which allows access, or does not allow access, to said data in response to said query;

a path expression extraction means for extracting the path expressions from a query expression specifying a retrieval method for the database; and a query expression access right decision means for deciding access rights in the database retrieval by the query expression based on decision results of access rights for the individual path expressions extracted from the query expression.

9. A program for analyzing the right of access to a database handling a data file, described in a form of a structured document, by controlling a computer, the program encoded on the computer, the program allowing the computer to function as:

a database storing an XML document;

a preliminary access rights analysis device which decides, based on path expressions describing retrieval conditions used in retrieval for the database and an access control policy describing access control rules, to which one of
1) always permitted,
2) always denied, and
3) indeterminate access right in the database retrieval using the path expressions corresponds, said preliminary access rights analysis device deciding said access rights without retrieving said XML document if said access right is always permitted or always denied, and wherein if said access right is indeterminate, then said database retrieval system accessing said XML document to determine an access right;

a query automaton generation unit for generating a query automaton from a path expression in which a retrieval condition for the database is described, wherein said path expression is extracted from a query requesting access to said database;

an access control automaton generation unit for generating an access control automaton from an access control policy in which an access control rule is described;

an operation unit having instructions for deciding access rights in database retrieval using the path expression by performing operations related to the query automaton generated by the query automaton generation unit and the access control automaton generated by the access control automaton generation unit, without accessing said data file stored in said database, said operation unit also having instructions for issuing a decision which allows access, or does not allow access, to said data in response to said query;

a path table control means for controlling a path table describing paths of a data file stored in the database;

an access right decision means for selecting a predetermined path in the path table controlled by the path table control unit by a path expression describing a retrieval condition for the database, applying an access control policy describing access control rules and deciding the presence of an access right in database retrieval by the path expression with respect to the predetermined path without accessing said data file;

a path expression extraction means for extracting the path expressions from a query expression specifying a retrieval method for the database; and a query expression access right decision means for deciding access rights in the database retrieval by the query expression based on decision results of access rights for the individual path expressions extracted from the query expression.

* * * * *